United States Patent
Takahashi

(10) Patent No.: US 10,714,774 B2
(45) Date of Patent: Jul. 14, 2020

(54) FUEL CELL SYSTEM

(71) Applicant: TOYOTA JIDOSHA KABUSHIKI KAISHA, Toyota-shi, Aichi-ken (JP)

(72) Inventor: Manabu Takahashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 174 days.

(21) Appl. No.: 16/027,656

(22) Filed: Jul. 5, 2018

(65) Prior Publication Data
US 2019/0020046 A1    Jan. 17, 2019

(30) Foreign Application Priority Data

Jul. 12, 2017  (JP) .................... 2017-135834

(51) Int. Cl.
*H01M 8/04*  (2016.01)
*H01M 8/08*  (2016.01)
(Continued)

(52) U.S. Cl.
CPC ... *H01M 8/04753* (2013.01); *H01M 8/04097* (2013.01); *H01M 8/04201* (2013.01);
(Continued)

(58) Field of Classification Search
CPC ....... H01M 8/04; H01M 8/02; H01M 8/04746
See application file for complete search history.

(56) References Cited

U.S. PATENT DOCUMENTS

2002/0177016 A1* 11/2002 Okamoto ............ H01M 8/0612
                                                            429/415
2003/0190512 A1* 10/2003 Takahashi ............. H01M 8/023
                                                            429/429

(Continued)

FOREIGN PATENT DOCUMENTS

JP    2012-18854     1/2012
JP    2014-197481    10/2014

*Primary Examiner* — Kenneth J Douyette
(74) *Attorney, Agent, or Firm* — Finnegan, Henderson, Farabow, Garrett & Dunner, LLP

(57) ABSTRACT

A fuel cell system comprises: a fuel cell stack having a plurality of unit cells in which anode gas flow paths are formed; an anode gas supply unit configured to supply anode gas to the fuel cell stack via an anode gas supply port of the fuel cell stack; a pressure sensor provided between the anode gas supply port and the anode gas supply unit to measure anode gas supply pressure; a current sensor configured to measure electric current of the fuel cell stack; and a controller configured to control anode gas supply quantity of the anode gas supply unit to thereby control the anode gas supply pressure. The controller is configured to, when there has been satisfied a blockage-predictable condition indicating that occurrence of blockage due to liquid water in the anode gas flow paths of at least one unit cell is predictable, calculate a first pressure for setting a stoichiometric ratio of anode gas to a predetermined value, the stoichiometric ratio being calculated from a current of the fuel cell stack and the anode gas supply quantity, then compare the first pressure with a second pressure for resolving blockage in the anode gas flow paths due to liquid water to determine a higher-in-value one of the first pressure and the second pressure as a selected pressure, and control the anode gas supply quantity so that the anode gas supply pressure becomes the selected pressure.

5 Claims, 5 Drawing Sheets

(51) Int. Cl.
*H01M 8/043* (2016.01)
*H01M 8/04746* (2016.01)
*H01M 8/0438* (2016.01)
*H01M 8/04537* (2016.01)
*H01M 8/04228* (2016.01)
*H01M 8/04082* (2016.01)
*H01M 8/04089* (2016.01)
*H01M 8/04955* (2016.01)
*H01M 8/04664* (2016.01)
*H01M 8/04223* (2016.01)

(52) U.S. Cl.
CPC ... *H01M 8/04228* (2016.02); *H01M 8/04231* (2013.01); *H01M 8/04388* (2013.01); *H01M 8/04559* (2013.01); *H01M 8/04589* (2013.01); *H01M 8/04679* (2013.01); *H01M 8/04955* (2013.01)

(56) References Cited

U.S. PATENT DOCUMENTS

| | | | |
|---|---|---|---|
| 2007/0015016 A1* | 1/2007 | Aoyama | H01M 8/04231 429/429 |
| 2010/0159340 A1* | 6/2010 | Oomori | H01M 8/04253 429/432 |
| 2015/0207158 A1* | 7/2015 | Nanba | H01M 8/04798 429/442 |
| 2016/0013509 A1* | 1/2016 | Iwasaki | H01M 8/04156 429/458 |

* cited by examiner

FUEL CELL SYSTEM

CROSS REFERENCE TO RELATED APPLICATIONS

This application claims priority to Japanese Patent Application No. 2017-135834 filed on Jul. 12, 2017, the entire contents of which are incorporated by reference herein.

BACKGROUND

Field

The present disclosure relates to a fuel cell system including a fuel cell stack.

Related Art

Anode gas flow paths in unit cells of a fuel cell stack may be blocked by liquid water resulting from power generation. Scavenging operation is executed to suppress blockage of the anode gas flow paths by liquid water in a halt state of the fuel cell system. In a fuel cell system of JP2014-197481 A, scavenging operation is executed with anode gas used as a scavenging gas to discharge liquid water, which resides in anode-offgas lead-out flow paths, to outside of the unit cells, thereby suppressing blockage of the anode-offgas lead-out flow paths.

However, performing the scavenging operation by always using large amounts of anode gas in a halt of the fuel cell system would lower the fuel efficiency of anode gas. For this reason, there is a desire that the supply amount of anode gas be made as small as possible. Also, the inventor of the present disclosure has found that not only in a halt state of the fuel cell system but also in normal operation and low-load operation states, blockage due to liquid water may occur to the anode gas flow paths, causing a problem that unit cells become deficient in anode gas so as to be deteriorated.

SUMMARY

The present disclosure, having been accomplished to solve the above-described problems, can be implemented in the following aspects.

Solution to Problem (1) According to an aspect of the present disclosure, there is provided a fuel cell system. The fuel cell system comprises: a fuel cell stack having a plurality of unit cells in which anode gas flow paths are formed; an anode gas supply unit configured to supply anode gas to the fuel cell stack via an anode gas supply port of the fuel cell stack; a pressure sensor provided between the anode gas supply port and the anode gas supply unit to measure anode gas supply pressure; a current sensor configured to measure electric current of the fuel cell stack; and a controller configured to control anode gas supply quantity of the anode gas supply unit to thereby control the anode gas supply pressure. The controller is configured to, when there has been satisfied a blockage-predictable condition indicating that occurrence of blockage due to liquid water in the anode gas flow paths of at least one unit cell is predictable, calculate a first pressure for setting a stoichiometric ratio of anode gas to a predetermined value, the stoichiometric ratio being calculated from a current of the fuel cell stack and the anode gas supply quantity, then compare the first pressure with a second pressure for resolving blockage in the anode gas flow paths due to liquid water to determine a higher-in-value one of the first pressure and the second pressure as a selected pressure, and control the anode gas supply quantity so that the anode gas supply pressure becomes the selected pressure.

According to the fuel cell system in this aspect, since the anode gas supply quantity is controlled by using the higher one of the first pressure and the second pressure, the anode gas supply will be suppressed as compared with cases in which a large quantity of anode gas is supplied so as to ensure a pressure enough higher than the foregoing pressures at all times. Also, since the anode gas supply quantity is adjusted upon satisfaction of the blockage-predictable condition independently of the operational status of the fuel cell system, liquid water residing in the anode gas flow paths of the unit cells will be discharged out of the unit cells, so that blockage of the anode gas flow paths will be resolved, thereby suppressing deterioration of the unit cells.

(2) According to another aspect, the fuel cell system may further comprise: a system switch configured to give an instruction as to start-up and halt of the fuel cell system; and a cell monitor configured to detect cell voltage of the plurality of unit cells. It may be decided that the blockage-predictable condition has been satisfied when an instruction for halting the fuel cell system has been issued by the system switch, or when the cell monitor has detected a negative voltage during operation of the fuel cell system.

When an instruction for halting the fuel cell system has been issued, or when the cell monitor has detected a negative voltage, blockage due to liquid water is highly likely to occur in the anode gas flow paths of the unit cells. In such a case, according to the fuel cell system in this aspect, since the controller adjusts the anode gas supply quantity, liquid water residing in the anode gas flow paths of the unit cells will be discharged out of the unit cells, so that blockage of the anode gas flow paths will be resolved, thereby suppressing deterioration of the unit cells.

(3) According to another aspect, the predetermined value of the stoichiometric ratio of the anode gas may be within a range of 1.2 to 1.3.

According to the fuel cell system in this aspect, anode gas supply to the fuel cell stack will be ensured enough. Thus, the unit cells are free from an anode-gas deficiency state, so that deterioration of the unit cells will be suppressed.

(4) According to another aspect, the anode gas supply unit may include: an injector configured to supply anode gas from an anode gas tank to the anode gas supply port; anode gas return piping configured to return anode gas discharged from an anode gas discharge port of the fuel cell stack to the anode gas supply port; and an anode gas circulation pump provided on the anode gas return piping. The controller may be configured to regulate at least either one of discharge flow rate of the injector and rotating speed of the anode gas circulation pump in such a way that the stoichiometric ratio of the anode gas becomes the predetermined value.

According to the fuel cell system in this aspect, the stoichiometric ratio of anode gas is regulated so as to become a predetermined value. Thus, necessary anode gas quantity is supplied to the unit cells, so that deterioration of the unit cells will be suppressed.

(5) According to another aspect, the second pressure may be a value resulting from adding up an anode gas supply pressure which decreases during halt-mode operation executed after issuance of an instruction for halting the fuel cell system by the system switch and before halting of the fuel cell system, and a pressure increment enabling discharge of liquid water residing in the anode gas flow paths.

According to the fuel cell system in this aspect, when the second pressure is set as the selected pressure, liquid water residing in the anode gas flow paths will be discharged out with reliability, so that deterioration of the unit cells will be suppressed.

The present disclosure may also be implemented in various modes other than the above-described aspects. For example, the disclosure may be implemented in such modes as a drain method for fuel cell stacks and a fuel cell vehicle.

DESCRIPTION OF EMBODIMENTS

Figure 1:
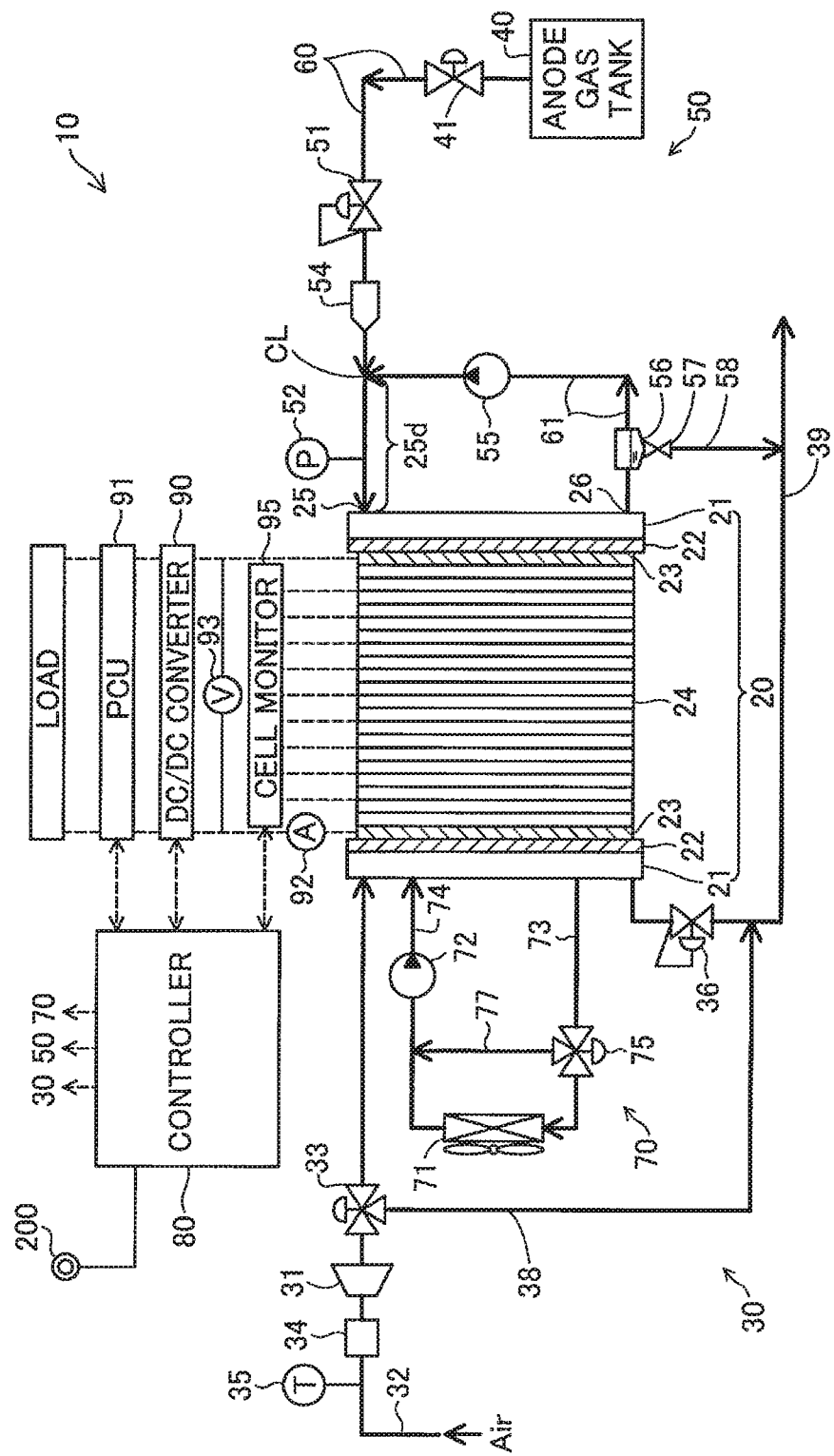
FIG. 1 is an explanatory view showing a schematic configuration of a fuel cell system according to an embodiment of the present disclosure.

FIG. 1 is an explanatory view showing a schematic configuration of a fuel cell system 10 according to an embodiment of the present disclosure. The fuel cell system 10, for example, is mounted on a vehicle to output electric power serving as a power source of the vehicle on request from a vehicle driver. The fuel cell system 10 includes a fuel cell stack 20, an anode gas supply/circulation system 50, a cathode gas supply/discharge system 30, a cooling medium circulation system 70, a controller 80, a DC/DC converter 90, a power control unit (hereinafter, referred to as 'PCU') 91, and a cell monitor 95.

In the fuel cell stack 20, stacked in the following order are an end plate 21, an insulating plate 22, a current collecting plate 23, a plurality of unit cells 24, a current collecting plate 23, an insulating plate 22, and an end plate 21. Each unit cell 24 is made up of an unshown membrane electrode assembly, and two separators between which the membrane electrode assembly are sandwiched froth both anode and cathode sides thereof. The fuel cell stack 20 also includes an anode gas supply port 25 and an anode gas discharge port 26. Anode gas merging piping 25d is connected to the anode gas supply port 25.

The anode gas supply/circulation system 50 functions as an anode gas supply unit for supplying anode gas to the fuel cell stack 20 via the anode gas supply port 25 of the fuel cell stack 20. Supply of the anode gas in the anode gas supply/circulation system 50 includes supply from an anode gas storage container and supply by anode gas return flow. In the example of FIG. 1, hydrogen is adopted as the anode gas. The anode gas supply/circulation system 50 includes an anode gas tank 40, a shutoff valve 41, anode gas supply piping 60, a regulator 51, an injector 54, anode gas return piping 61, an anode gas circulation pump 55, a gas-liquid separator 56, a shutoff valve 57, and exhaust/drain piping 58.

The anode gas tank 40 is a storage container for hydrogen gas at a high-pressure of several tens of MPa. The anode gas supply piping 60 is connected between the anode gas tank 40 and one end CL of the anode gas merging piping 25d to supply hydrogen derived from the anode gas tank 40 to the fuel cell stack 20. Provided on the anode gas supply piping 60 are the shutoff valve 41, the regulator 51, and the injector 54 in this order as mentioned from the anode gas tank 40 side. The regulator 51 regulates the pressure of hydrogen. The injector 54 supplies hydrogen derived from the anode gas tank 40 via the anode gas merging piping 25d to the anode gas supply port 25 of the fuel cell stack 20.

The anode gas return piping 61 is piping for returning anode gas discharged from the anode gas discharge port 26 of the fuel cell stack 20 to the anode gas supply port 25. The anode gas return piping 61 has one end connected to the anode gas discharge port 26 of the fuel cell stack 20, and the other end connected to the one end CL of the anode gas merging piping 25d. That is, hydrogen supplied along the anode gas supply piping 60 and hydrogen supplied along the anode gas return piping 61 merge together at the anode gas merging piping 25d so as to be fed to the anode gas supply port 25 of the fuel cell stack 20.

Provided on the anode gas return piping 61 are the gas-liquid separator 56 and the anode gas circulation pump 55 in this order as mentioned from one side closer to the anode gas discharge port 26 of the fuel cell stack 20. The gas-liquid separator 56 separates gas and liquid, from each other, which are discharged from the anode gas discharge port 26 of the fuel cell stack 20. Gas discharged from the anode gas discharge port 26 is composed mainly of hydrogen having been unused for power generation, nitrogen having penetrated from cathode to anode side of each unit cell 24, and steam generated by power generation. Liquid discharged from the anode gas discharge port 26 is composed mainly of liquid water generated by power generation. The gas-liquid separator 56 separates nitrogen and liquid water out of these gas and liquid to discharge the separated nitrogen and liquid water outside via the shutoff valve 57 and the exhaust/drain piping 58. Hydrogen and steam remaining in the gas-liquid separator 56 are returned to the anode gas return piping 61 as anode gas by the anode gas circulation pump 55. A pressure sensor 52 for measuring anode gas supply pressure is placed between the anode gas supply port 25 of the fuel cell stack 20 and the anode gas supply/circulation system 50, i.e., on the anode gas merging piping 25d.

The cathode gas supply/discharge system 30 performs supply of cathode gas and discharge of cathode gas to and from the fuel cell stack 20 under control by the controller 80. In the example of FIG. 1, air is adopted as the cathode gas. The cathode gas supply/discharge system 30 includes cathode gas supply piping 32, a compressor 31, a three-way valve 33, bypass piping 38, a pressure regulating valve 36, and cathode gas discharge piping 39.

The cathode gas supply piping 32 is connected to the fuel cell stack 20 to supply air taken in from outside to the fuel cell stack 20. Provided on the cathode gas supply piping 32 are an outside air temperature sensor 35, an air flowmeter 34, a compressor 31, and a three-way valve 33 in this order as mentioned from the air inlet side. The outside air temperature sensor 35 measures temperature of air before its intake. The air flow meter 34 measures quantity of intake air. The compressor 31 compresses the intake air. The three-way valve 33 is connected to the bypass piping 38 to regulate flow rate of air flowing to the fuel cell stack 20 and the bypass piping 38. The bypass piping 38 is connected to the cathode gas discharge piping 39.

The cathode gas discharge piping 39 has an upstream-side end portion connected to the fuel cell stack 20, as well as its halfway sites connected to the bypass piping 38 and the exhaust/drain piping 58 of the anode gas supply/circulation system 50, respectively. The cathode gas discharge piping 39 discharges, to outside, cathode offgas discharged from the fuel cell stack 20, air diverged to the bypass piping 38, and nitrogen plus liquid water discharged from the exhaust/drain piping 58. Also, the pressure regulating valve 36 is provided on the cathode gas discharge piping 39. The pressure regulating valve 36 is located at a site that is closer to the fuel cell stack 20 than the connecting site between the cathode gas discharge piping 39 and the bypass piping 38. The pressure regulating valve 36 regulates pressure of air supplied to the fuel cell stack 20.

The cooling medium circulation system 70 cools the fuel cell stack 20 under control by the controller 80. The cooling medium circulation system 70 includes refrigerant supply piping 74, refrigerant discharge piping 73, a radiator 71, bypass piping 71, a three-way valve 75, and a refrigerant pump 72. The refrigerant is given by use of, for example, water, ethylene glycol or other nonfreezing water, air or the like. The refrigerant pump 72 is provided on the refrigerant supply piping 74 to supply the refrigerant to the fuel cell stack 20. The three-way valve 75 regulates flow rate of the refrigerant flowing to the radiator 71 and the bypass piping 77.

The cell monitor 95 has a function of detecting cell voltage of the plurality of unit cells 24. In the example of FIG. 1, under control by the controller 80, the cell monitor 95, with every two unit cells 24 unitized as one channel, detects a total voltage of two cell voltages per channel on a channel basis. The number of unit cells 24 per channel may be one, or otherwise, three or more. In the case where the number of unit cells 24 per channel is N where N is an integer of 2 or more, assuming that cell voltages of (N−1) unit cells 24 out of the N unit cells 24 are each an average cell voltage, a cell voltage of the remaining one unit cell 24 can be estimated. The average cell voltage is a value determined by dividing a voltage across the fuel cell stack 20 measured by a stack voltage sensor 93 by the number of unit cells 24. A cell voltage estimated in this way is also equivalent to "cell voltage detected by the cell monitor 95." In ordinary cases, since only one of the N unit cells 24 may take a negative voltage, it is scarcely problematic for practical use to utilize the assumption that the (N−1) unit cells 24 are equal to the average cell voltage.

The DC/DC converter 90 boosts a voltage outputted from the fuel cell stack 20 and supplies the resulting voltage to the PCU 91 under control by the controller 80. The PCU 91, containing an inverter, supplies electric power to a load under control by the controller 80. The PCU 91 also regulates electric current of the fuel cell stack 20 under control by the controller 80. A current sensor 92 for measuring the current of the fuel cell stack 20 is provided between the fuel cell stack 20 and the DC/DC converter 90.

The controller 80 is configured as a computer including a CPU, RAM and nonvolatile memory, specifically being an ECU (Electronic Control Unit). The controller 80 outputs signals for controlling start-up and halt of individual devices in the fuel cell system 10 in response to instructions (ON and OFF operations) of a system switch 200. The system switch 200 is equivalent to, for example, an ignition switch or a power switch of vehicles. Also, the controller 80, receiving a power generation request, controls individual parts of the fuel cell system 10 to throw the fuel cell stack 20 into power generation. The controller 80 controls the anode gas supply pressure by controlling the anode gas supply quantity of the anode gas supply/circulation system 50, i.e., by controlling the gas supply quantity of the injector 54 and the anode gas circulation pump 55.

Figure 2:
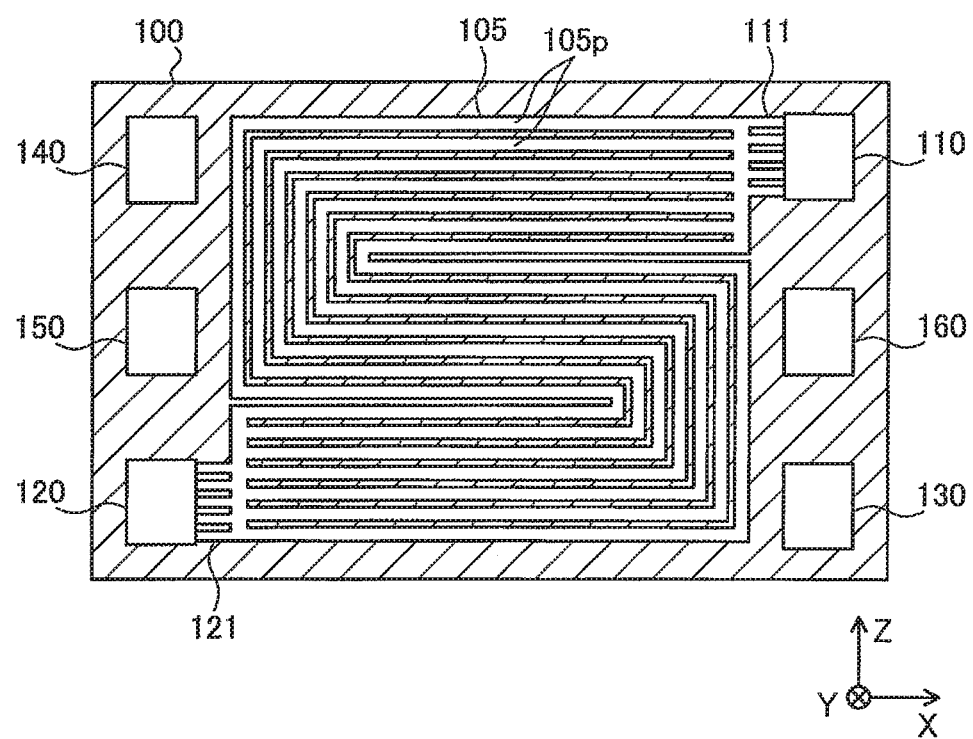
FIG. 2 is an explanatory view showing a schematic configuration of an anode-side separator of a unit cell.

FIG. 2 is an explanatory view showing a schematic configuration of an anode-side separator 100 of a unit cell 24 in the fuel cell stack 20 (FIG. 1), as viewed from the membrane electrode assembly side. In FIG. 2, X direction is along a horizontal direction, Z direction is along a vertical upward direction, and Y direction is along a stacking direction of the unit cells 24. An anode-gas inlet manifold hole 110, a cooling-medium outlet manifold hole 160, and a cathode-gas inlet manifold hole 130 are provided so as to be arrayed in order from above to below in one longitudinal end-edge portion of the separator 100. By contrast, a cathode-gas outlet manifold hole 140, a cooling-medium inlet manifold hole 150, and an anode-gas outlet manifold hole 120 are provided so as to be arrayed in order from above to below in the other end-edge portion of the separator 100. The anode-gas inlet manifold hole 110 and the anode-gas outlet manifold hole 120 communicate with the anode gas supply port 25 and the anode gas discharge port 26, respectively, of the fuel cell stack 20 shown in FIG. 1.

In central part of the separator 100, plural stripe-like anode gas flow paths 105 are formed. Each anode gas flow path 105 has an anode gas lead-in part 111 communicating with the anode-gas inlet manifold hole 110, and an anode gas lead-out part 121 communicating with the anode-gas outlet manifold hole 120. In the example of FIG. 2, the anode gas flow paths 105 are serpentine flow paths formed from a plurality of striped divisional flow paths 105p that are equidistantly arranged and meandering. Also, the anode gas lead-in part 111 and the anode gas lead-out part 121 are comb-tooth like shaped.

Hydrogen supplied to the anode-gas inlet manifold hole 110 passes through the anode gas lead-in part 111, flowing into the divisional flow paths 105p. The hydrogen having flowed into the divisional flow paths 105p, while meandering, passes through the anode gas lead-out part 121 and flows to the anode-gas outlet manifold hole 120. At this point, there is a possibility that when the hydrogen supplied to the anode-gas inlet manifold hole 110 contains liquid water generated by power generation or condensed water residing in the anode gas circulation pump 55 (FIG. 1) or the like, the anode gas flow paths 105, particularly the anode gas lead-in part 111, may be blocked by such liquid water.

Figure 3:
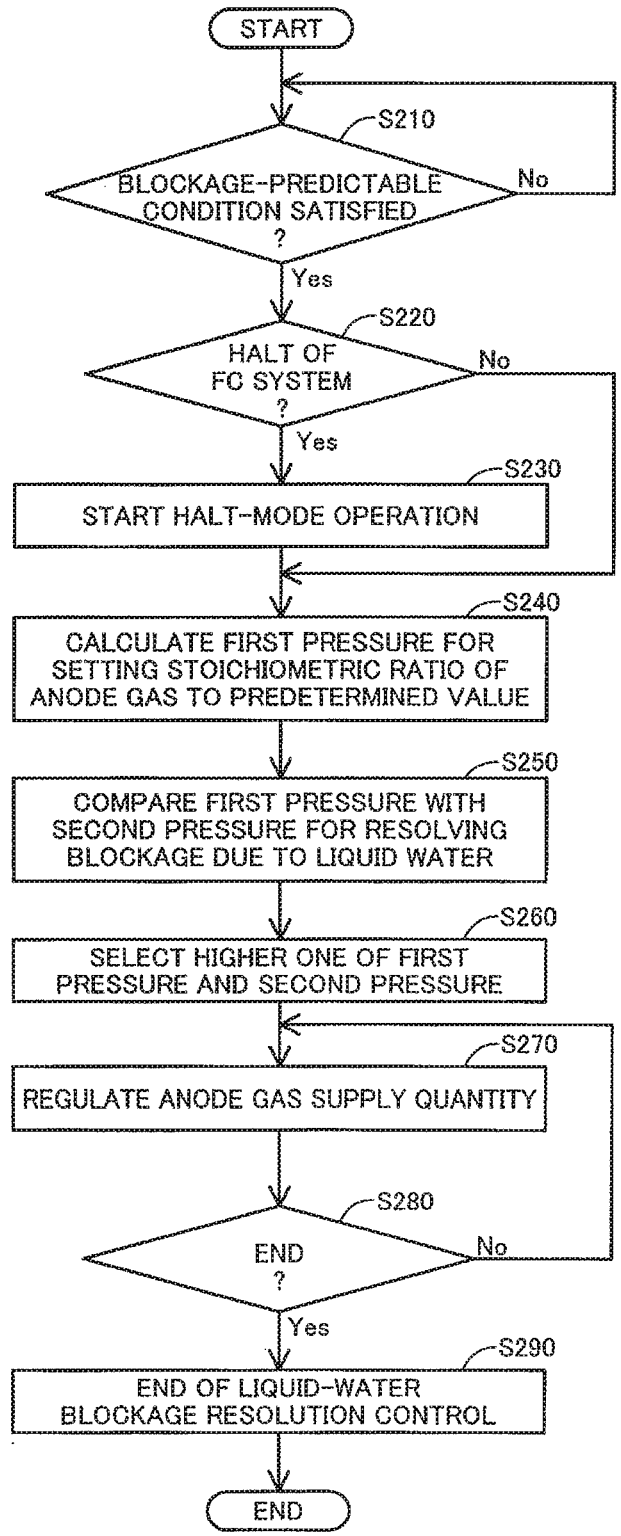
FIG. 3 is a flowchart showing liquid-water blockage resolution control.

FIG. 3 is a flowchart showing liquid-water blockage resolution control in the fuel cell system 10. This control process is normally and repeatedly being executed during the operation of the fuel cell system 10. At step S210, the controller 80 decides whether or not there has been satisfied a blockage-predictable condition indicating that occurrence of a blockage due to liquid water is predictable in the anode gas flow paths 105 (FIG. 2) of the separator 100 of the unit cells 24. It is decided that the blockage-predictable condition has been satisfied when an instruction for halting the fuel cell system 10 is issued by the system switch 200 or when a negative voltage is detected by the cell monitor 95 during operation of the fuel cell system 10. In the case where the instruction for halting the fuel cell system 10 has been issued, turning off the system switch 200 causes the rotating speed of the anode gas circulation pump 55 to be decreased so as to reduce noise and vibrations. As a result of this, the flow rate of anode gas decreases such that liquid water becomes more likely to reside within the unit cells 24 and therefore blockage of the anode gas flow paths 105 due to liquid water easily occurs. Also, in the case where the cell monitor 95 has detected a negative voltage during operation of the fuel cell system 10, there is a high likelihood that blockage due to liquid water has occurred in the anode gas flow paths 105 so as to block the supply of the anode gas to the unit cells 24. Other than the above cases, it may be decided that the blockage-predictable condition has been satisfied also in cases, for example, where the fuel cell system 10 halts and restarts and executes normal operation after executing warming-up operation to raise temperature of the fuel cell stack 20, or where the fuel cell system 10 executes normal operation with outside air temperature below the freezing point. That is, in these two cases, since condensed water is highly likely to occur in the anode gas circulation pump 55 due to temperature differences between the anode gas and the anode gas circulation pump 55, it is highly likely that the liquid water may flow into the anode gas flow paths 105 of the unit cells 24 so as to cause blockage.

When it is decided at step S210 that the blockage-predictable condition has not been satisfied, the controller 80 executes the step S210 once again. Meanwhile, when it is decided that the blockage-predictable condition has been satisfied, the processing flow moves on to step S220.

At step S220, the controller 80 decides whether or not an instruction for halting the fuel cell system 10 has been issued by the system switch 200. When it is decided that the instruction for halting the fuel cell system 10 has been issued, the processing flow moves on to step S230. At step S230, the controller 80 starts halt-mode operation before halting the fuel cell system 10. The term 'halt-mode operation' refers to an operation to be executed before operations of individual systems of the fuel cell system 10 are completely halted. In the halt-mode operation, for example, the compressor 31 of the cathode gas supply/discharge system 30 is first halted, and the rotating speed of the anode gas circulation pump 55 is lowered. Also, a small current is derived from the fuel cell stack 20 to prevent the voltage of the unit cells 24 from becoming an open circuit voltage (OCV). On the other hand, when it is decided at step S220 that no instruction for halting the fuel cell system 10 has been issued, the processing flow moves on to step S240 with step S230 omitted.

At step S240, the controller 80 calculates a first pressure for setting a stoichiometric ratio of anode gas to a predetermined value. The term 'stoichiometric ratio' herein refers to an actual anode gas flow rate relative to an anode gas flow rate theoretically required for power generation. The anode gas flow rate theoretically required for power generation, i.e., an anode gas flow rate actually consumed by the fuel cell stack 20 at the time of step S240 may be calculated by a current value of the fuel cell stack 20 measured by the current sensor 92 (FIG. 1). Also, the actual anode gas flow rate, i.e., an anode gas flow rate supplied to the fuel cell stack 20 at the time of step S240 may be calculated based on an anode gas discharge flow rate by the injector 54 (FIG. 1) and the rotating speed of the anode gas circulation pump 55 (FIG. 1). The calculation of the actual anode gas flow rate may be done in consideration of gaseous discharge volume and liquid discharge volume of the gas-liquid separator 56 (FIG. 1) in addition to the anode gas discharge flow rate by the injector 54 and the rotating speed of the anode gas circulation pump 55.

The term 'predetermined value' of anode gas stoichiometric ratio refers to such a value of the anode gas stoichiometric ratio as to prevent insufficiency of anode gas supply to the fuel cell stack 20, where a value within a range of 1.2 to 1.3 is preferably adopted for the stoichiometric ratio value. The predetermined value has been stored in the nonvolatile memory within the controller 80. The predetermined value of anode gas stoichiometric ratio may be larger than 1.3.

At step S250, the controller 80 compares the first pressure calculated in step S240 with a second pressure aimed at resolving any blockage due to liquid water of the anode gas flow paths 105. In this case, given that the fuel cell system 10 has executed step S230, the second pressure may be set to a value resulting from adding up an anode gas supply pressure, which decreases in the halt-mode operation after the issuance of the instruction for halting the fuel cell system 10 by the system switch 200, and a pressure increment enabling discharge of liquid water residing in the anode gas flow paths 105. In the halt-mode operation, as the rotating speed of the anode gas circulation pump 55 is lowered so as to reduce its noise and vibrations, so the anode gas supply pressure decreases accordingly. The anode gas supply pressure resulting after its decrease becomes a value between 160 kPa and 190 kPa, for example. The pressure increment enabling discharge of liquid water residing in the anode gas flow paths 105 may be calculated by a cross-sectional area of the anode gas flow paths 105, a predicted liquid water quantity, and the like. Preferably, the lower-limit value of the pressure increment is set to 33 kPa to ensure reliable discharge of the liquid water. Also, in order to prevent excessive rise of anode-gas discharge concentration at a restart of the fuel cell system 10, the upper-limit value of the pressure increment is preferably set to 60 kPa. The second pressure does not necessarily need to be calculated as the above-described added-up value of anode gas supply pressure and pressure increment, and may be determined in advance experimentally or empirically.

At step S260, the controller 80 adopts either the first pressure or the second pressure, whichever is higher in value, as a selected pressure. At step S270, the controller 80 regulates the anode gas supply quantity of the anode gas supply/circulation system 50 so that the anode gas supply pressure becomes the selected pressure. Doing in this way makes it possible to discharge liquid water residing in the anode gas flow paths 105 of the unit cells 24 out of the unit cells 24, thus allowing the blockage due to liquid water to be resolved.

At step S280, the controller 80 decides whether or not the regulation of anode gas supply quantity in step S270 has been ended. An ending condition in this case may be that, for example, when the halt-mode operation of step S230 has been executed, the cell voltage of the unit cells 24 lowers to an ending voltage value or lower. This ending voltage value is a value at which the cell voltage is low enough to make a judgment that subsequently setting the current to zero never causes deterioration of the unit cells 24. For the ending voltage value, a value of 0.80 V to 0.90 V is adopted as an example. When it is decided that the regulation of anode gas supply quantity has not been ended, the processing flow returns to step S270. On the other hand, when it is decided that the regulation of anode gas supply quantity has been ended, the processing flow moves on to step S290, where the liquid-water blockage resolution control is ended. When the halt-mode operation has been started at step S230, the halt-mode operation is also ended, where operations of all the systems of the fuel cell system 10 are halted.

Figure 4:
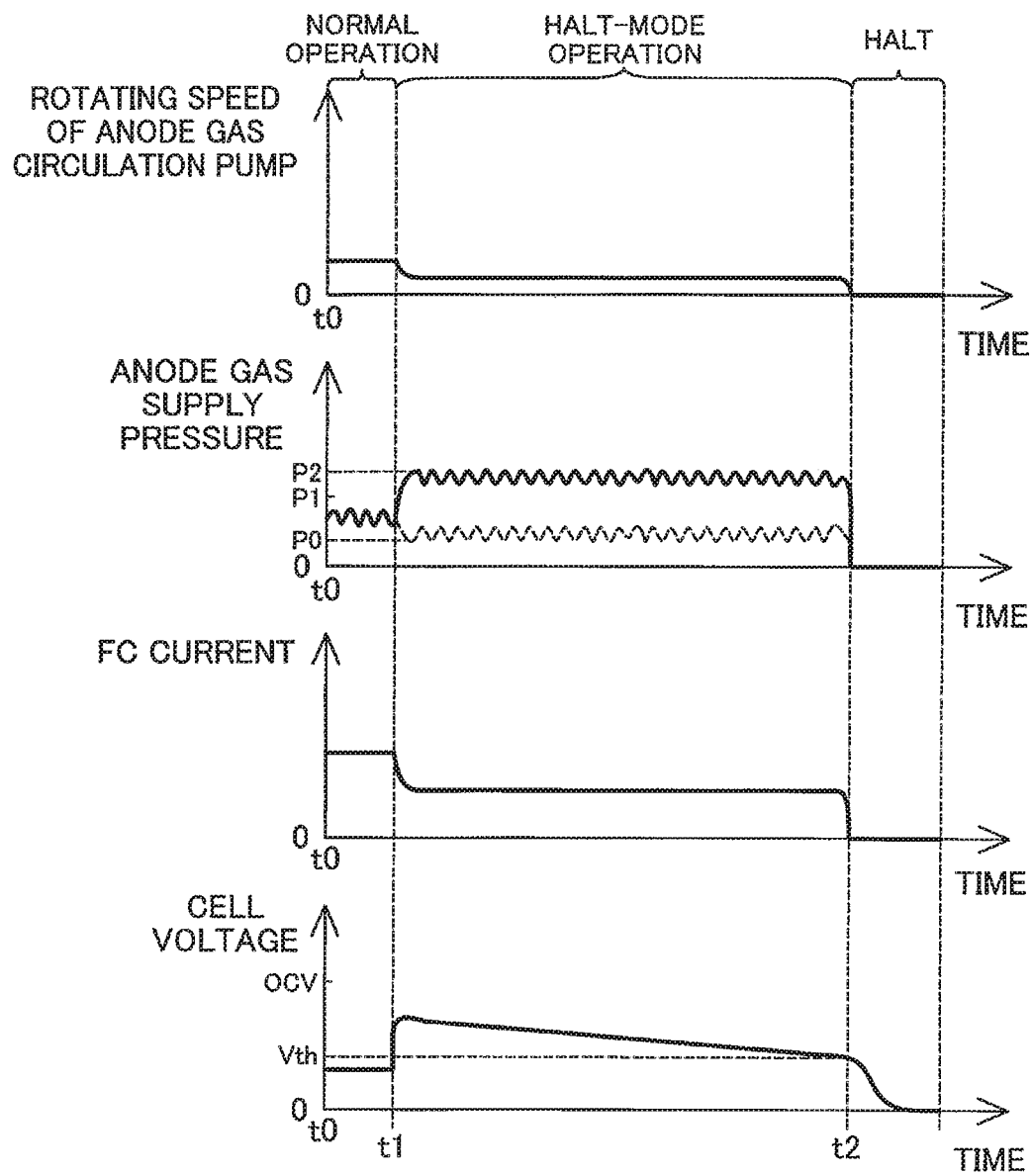
FIG. 4 is a chart showing an example of time variations in rotating speed of an anode gas circulation pump, anode gas supply pressure, FC current, and cell voltage during execution of the liquid-water blockage resolution control.

FIG. 4 is a chart showing an example of time variations in rotating speed of the anode gas circulation pump 55, anode gas supply pressure, current of the fuel cell stack 20, and cell voltage during execution of the liquid-water blockage resolution control. FIG. 4 shows a case in which the controller 80 sets the second pressure P2 as a selected pressure in step S260 of FIG. 3.

During a period from time t0 until time t1, the fuel cell system 10 executes normal operation. Herein, the term 'normal operation' implies a state in which the reactant gases are supplied enough, and the fuel cell system 10 is successful in operation.

At time t1, an instruction for halting the fuel cell system 10 is issued by the system switch 200. In this example, when an instruction for halting the fuel cell system 10 is issued, it is decided that the blockage-predictable condition is satisfied (S210-S220, FIG. 3). Accordingly, during a period from time t1 until time t2, the fuel cell system 10 executes the halt-mode operation (S230, FIG. 3) to derive a small current from the fuel cell stack 20. In this case, the rotating speed of the anode gas circulation pump 55 is lowered to reduce noise and vibrations. As the rotating speed of the anode gas circulation pump 55 lowers, the anode gas supply quantity decreases to a level equivalent to the pressure P0, and a first pressure P1 for ensuring the stoichiometric ratio of anode gas is calculated (S240, FIG. 3). In the example of FIG. 4, since the first pressure P1 is smaller than the second pressure P2 for resolving blockage due to liquid water, the anode gas supply pressure is regulated to the second pressure P2 (S250-S270, FIG. 3). With this arrangement, liquid water residing in the anode gas flow paths 105 of the unit cells 24 is discharged out of the unit cells 24, so that blockage due to liquid water can be resolved. At time t1, the compressor 31 of the cathode gas supply/discharge-system 30 is halted, with the result that the cell voltage of the unit cells 24 lowers gradually.

At time t2, the cell voltage of the unit cells 24 lowers below the ending voltage value Vth, where the liquid-water blockage resolution control is ended (S280-S290, FIG. 3). After time t2 onward, the anode gas supply/circulation system 50 of the fuel cell system 10 is completely halted.

Figure 5:
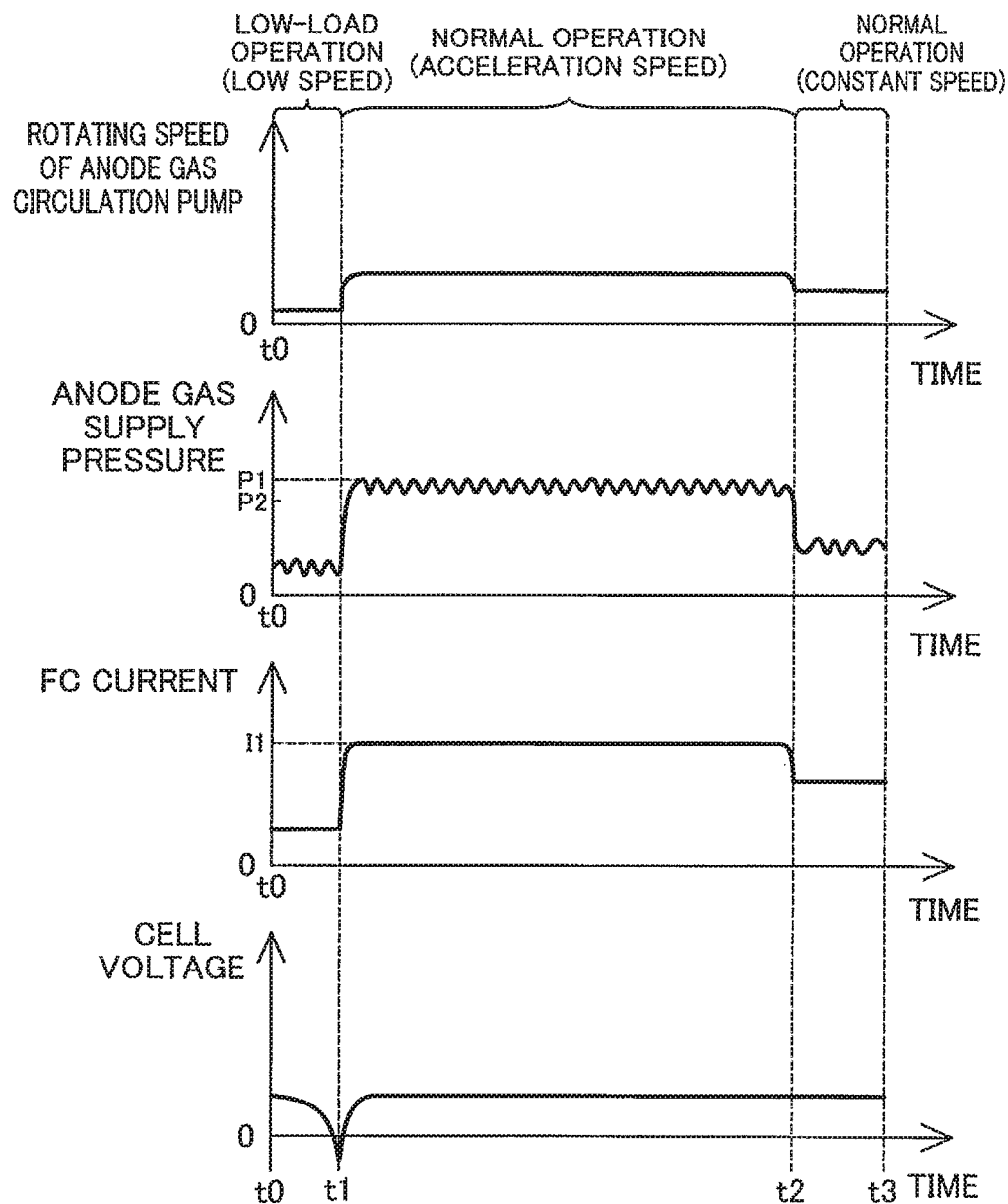
FIG. 5 is another chart showing an example of time variations in rotating speed of the anode gas circulation pump, anode gas supply pressure, FC current, and cell voltage during execution of the liquid-water blockage resolution control.

FIG. 5 is another chart showing an example of time variations in rotating speed of the anode gas circulation pump 55, anode gas supply pressure, current of the fuel cell stack 20, and cell voltage during execution of the liquid-water blockage resolution control. FIG. 5 shows a case in which the controller 80 sets the first pressure P1 as a selected pressure in step S260 of FIG. 3. FIG. 5 depicts an operating state of the fuel cell system 10 in which a vehicle having the fuel cell system 10 mounted thereon executes a low-speed run, an acceleration run, and a constant-speed run in this order on an assumption that the vehicle has encountered a traffic jam.

During a period from time t0 until time t1, since the fuel cell vehicle runs at a low speed (e.g., 10 km/h), the fuel cell system 10 executes the low-load operation. Even under the low-load operation, it is preferable to operate the anode gas supply/circulation system 50 and the cathode gas supply/discharge system 30 in such fashion that stoichiometric ratios of anode gas and cathode gas, respectively, come to values within a proper range (e.g., a range from 1.2 to 1.3).

As the fuel cell system 10 executes the low-load operation, the anode gas and the cathode gas come to low flow rates in response to the low load, so that a large quantity of liquid water resides in the unit cells 24 to thereby block the anode gas flow paths 105. As a result, the unit cells 24 incur an anode gas deficiency, so that a cell negative voltage is detected at time t1. Concurrently with this, in the example of FIG. 5, the fuel cell vehicle executes an acceleration run, where as the current of the fuel cell stack 20 increases, the rotating speed of the anode gas circulation pump 55 increases and the anode gas supply pressure increases as well. During the period from time t1 until time t2, the fuel cell system 10 executes the normal operation.

In the example of FIG. 5, when a cell negative voltage is detected during operation of the fuel cell system 10, it is decided that the blockage-predictable condition is satisfied (S210-S220, FIG. 3). Therefore, the first pressure P1 for ensuring the stoichiometric ratio of the anode gas is calculated (S240, FIG. 3). In the example of FIG. 5, since the first pressure P1 is larger than the second pressure P2 for resolving blockage due to liquid water, the anode gas supply pressure is regulated to the first pressure P1 (S250-S270, FIG. 3). More specifically, the controller 80 adjusts at least either one of the discharge flow rate of the injector 54 and the rotating speed of the anode gas circulation pump 55 in such a way that the stoichiometric ratio of the anode gas becomes a predetermined value, and adjusts the anode gas supply pressure to become the first pressure P1. With this arrangement, liquid water residing in the anode gas flow paths 105 of the unit cells 24 is discharged out of the unit cells 24, so that package due to the liquid water will be resolved.

At the time t2, the fuel cell vehicle ends the acceleration run to execute the constant-speed run. Responsive to this, the current of the fuel cell stack 20 decreases while the rotating speed of the anode gas circulation pump 55 and the anode gas supply pressure also decrease. Depending on the ending condition that the current of the fuel cell stack 20 becomes smaller than an acceleration current I1 as an example, the fuel cell system 10 ends the liquid-water blockage resolution control (S280-S290, FIG. 3). During a period from time t2 until time t3, the fuel cell system 10 executes the normal operation.

As described above, according to one embodiment of the present disclosure, since the controller 80 of the fuel cell system 10 controls the anode gas supply quantity by using the higher one of the first pressure and the second pressure, the anode gas supply will be suppressed as compared with cases in which a large quantity of anode gas is supplied so as to ensure a pressure enough higher than the foregoing pressures at all times. Also, since the controller 80 regulates the anode gas supply quantity on a halt or during a low-load operation of the fuel cell system 10 in such a way that the anode gas supply pressure becomes a selected pressure, liquid water residing in the anode gas flow-paths 105 of the unit cells 24 will be discharged out of the unit cells 24, so that blockage of the anode gas flow paths 105 will be resolved, thereby suppressing deterioration of the unit cells 24.

What is claimed is:

1. A fuel cell system comprising:
   a fuel cell stack having a plurality of unit cells in which anode gas flow paths are formed;
   an anode gas supply unit configured to supply anode gas to the fuel cell stack via an anode gas supply port of the fuel cell stack;
   a pressure sensor provided between the anode gas supply port and the anode gas supply unit to measure anode gas supply pressure;
   a current sensor configured to measure electric current of the fuel cell stack; and
   a controller configured to control anode gas supply quantity of the anode gas supply unit to thereby control the anode gas supply pressure, wherein the controller is programmed to, when there has been satisfied a blockage-predictable condition indicating that occurrence of blockage due to liquid water in the anode gas flow paths of at least one unit cell is predictable:
  calculate a first pressure for setting a stoichiometric ratio of anode gas to a predetermined value, the stoichiometric ratio being calculated from a current of the fuel cell stack and the anode gas supply quantity, then
  compare the first pressure with a second pressure for resolving blockage in the anode gas flow paths due to liquid water to determine a higher-in-value one of the first pressure and the second pressure as a selected pressure, and
  control the anode gas supply quantity so that the anode gas supply pressure becomes the selected pressure.

2. The fuel cell system in accordance with claim 1, further comprising:
  a system switch configured to give an instruction as to start-up and halt of the fuel cell system; and
  a cell monitor configured to detect cell voltage of the plurality of unit cells, wherein
  the controller is programmed to determine that the blockage-predictable condition has been satisfied when an instruction for halting the fuel cell system has been issued by the system switch, or when the cell monitor has detected a negative voltage during operation of the fuel cell system.

3. The fuel cell system in accordance with claim 1, wherein the predetermined value of the stoichiometric ratio of the anode gas is within a range of 1.2 to 1.3.

4. The fuel cell system in accordance with claim 1, wherein the anode gas supply unit includes:
  an injector configured to supply anode gas from an anode gas tank to the anode gas supply port;
  anode gas return piping configured to return anode gas discharged from an anode gas discharge port of the fuel cell stack to the anode gas supply port; and
  an anode gas circulation pump provided on the anode gas return piping, wherein
  the controller is programmed to regulate at least one of a discharge flow rate of the injector or a rotating speed of the anode gas circulation pump in such a way that the stoichiometric ratio of the anode gas becomes the predetermined value.

5. The fuel cell system in accordance with claim 2, wherein
  the second pressure is a value resulting from adding up an anode gas supply pressure which decreases during halt-mode operation executed after issuance of an instruction for halting the fuel cell system by the system switch and before halting of the fuel cell system, and a pressure increment enabling discharge of liquid water residing in the anode gas flow paths.

* * * * *